March 2, 1965     S. JEFFEE     3,172,115
FILM LEADER CONSTRUCTION
Filed June 18, 1963
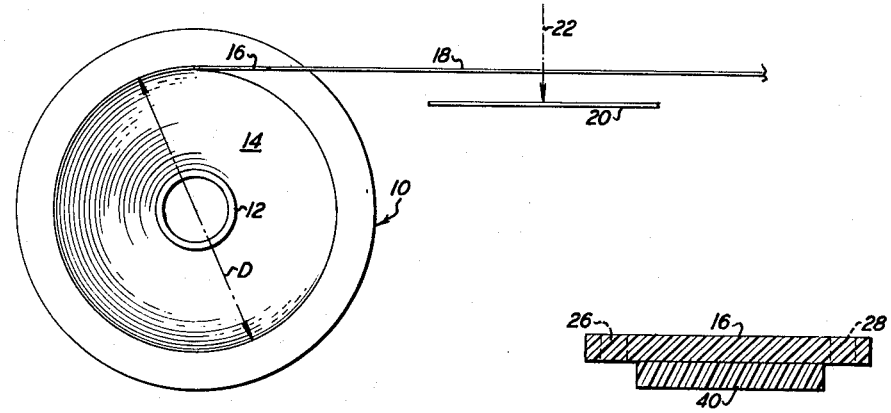
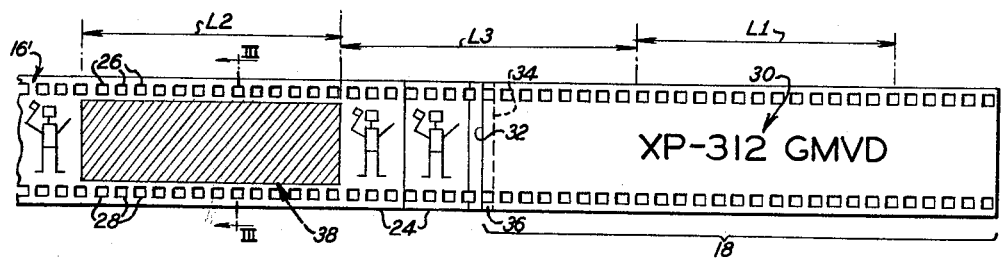
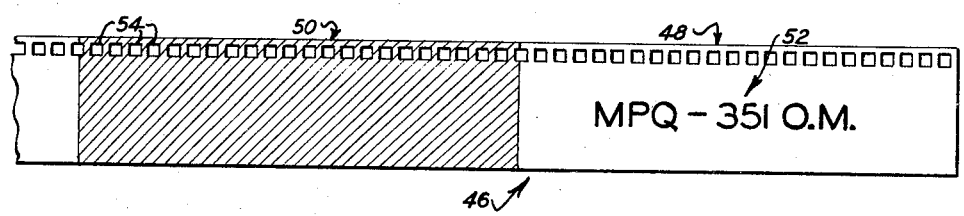
INVENTOR
SAUL JEFFEE

United States Patent Office 3,172,115
Patented Mar. 2, 1965

3,172,115
FILM LEADER CONSTRUCTION
Saul Jeffee, New York, N.Y., assignor to
Movielab, Inc., New York, N.Y.
Filed June 18, 1963, Ser. No. 288,676
2 Claims. (Cl. 352—235)

This invention relates to film constructions and to associated methods. More particularly, the invention relates to techniques for providing motion picture film identification.

In the field denoted generally above, provision is made for identifying motion picture films by attaching thereto identification leaders bearing intelligence relating to the associated film. It is a general object of the invention to provide means and techniques which facilitate examining this intelligence.

The general area with which the invention is concerned has been the subject of prior exploration. However, prior efforts to solve the problems contemplated by the invention have resulted in solutions characterized by various defects which it is the purpose of this invention to remedy.

For example, in connection with transparent identification leaders, the use has been suggested of an opaque backing affixed to the leader immediately behind the intelligence thereon to render the intelligence visible. Unfortunately, this approach renders it impossible to project the intelligence optically onto a screen or the like since the opaque backing is, of course, light impermeable.

Still further, the opaque backing employed by the prior art makes difficult the threading of this particular portion of the film aggregate into a projector, due to the increased thickness of the leader due, in turn, to the addition of the backing.

Additionally, the directly local association of the backing with the intelligence, perception of which is to be facilitated, renders critical the positioning of the backing. For example, the backing must be on a particular side of the film in order not to cover the intelligence which is to be viewed.

In view of the above-indicated deficiencies of the prior art, it is a specific object of the invention to provide improved means and techniques for rendering perceptible the intelligence on transparent identification leaders while maintaining the possibility of projecting the intelligence on such leaders onto a screen or the like.

Yet a further specific object of the invention is to provide improved means and techniques for rendering readily visible the intelligence on a transparent identification leader while at the same time avoiding interference with the threading of the leader into a projector or the like.

Still another specific object of the invention is to provide means and techniques for employing an opaque backing without rendering the positioning of the same critical or, in other words, while making it possible to place the opaque backing on either side of the film with which the backing is to be associated.

One method provided in accordance with a preferred embodiment of the invention and adapted to achieve various of the objectives noted above contemplates preparing a length of motion picture film adapted for being wound on a reel and, when positioned on this reel, adapted to constitute a wound film having an outer circumference of predetermined length; arranging on a generally transparent strip of film, corresponding in width and thickness to the motion picture film, opaque indications of intelligence related to the motion picture film while confining distribution of the indications to a length of this transparent strip which is no longer than said predetermined length; connecting the transparent strip of film to form an extension of the latter and to constitute therewith a complete film which may be wound upon the aforesaid reel with the strip outermost relative to the motion picture film so that the confined length of strip in which the indications are located mitigates against an overlapping of the indications; and forming on the aforesaid complete film an opaque length spaced from the length of transparent strip in which the indications are located. The opaque length is of such a dimension that it is adapted for underlying all of the indications on the transparent strip and the opaque length is further spaced from the indications by a distance such as to cause the opaque length to be aligned with and underlie the indications when the complete film is wound upon the reel.

It will be noted that the spacing of the opaque length from the indications on the transparent strip permits an optical projection of the indications when the strip is unwound from the reel. It will be moreover noted that the opaque length is spaced from the transparent strip or identification leader and therefore will not interfere with the threading of the same into a projector. Still further it will be noted that since the opaque backing is not positioned immediately adjacent the intelligence which is to be viewed, the backing may be on either side of the film and still perform the function of rendering the intelligence more readily visible.

An article of manufacture according to a preferred embodiment of the invention may comprise a reel upon which is wound a length of motion picture film which when positioned on the reel has an outer circumference of predetermined length, there being further provided a generally transparent strip of film corresponding in width and thickness to the motion picture film and being provided with opaque indications of intelligence related to the subject matter on the motion picture film. These indications are restricted to a length which is no longer than the aforesaid predetermined length, the transparent strip of film being connected to the motion picture film to form an extension of the latter and thereby to form an identification leader. The film aggregate is in convolute relationship on the reel with the transparent strip outermost, the film aggregate including an opaque length with a color contrasting to that of the indications and spaced from the length of transparent strip in which the indications are located, whereby a backing is provided for the indications of intelligence without interfering with the possibilities of optically projecting the same in a projector or the like.

The invention will be more readily understood from the following detailed description, which sets forth further objects, advantages and features of the invention and which is illustrated in the accompanying drawing wherein:

FIGURE 1 is a diagrammatical representation of a reel having a film wound thereon and provided with an identification leader in accordance with the invention;

FIGURE 2 is a top plan view of the end of a motion picture film including an identification leader thereon in accordance with one embodiment of the invention;

FIGURE 3 is a sectional view taken along line III—III of FIG. 2; and

FIGURE 4 is a top plan view of a further embodiment of the invention.

In FIGURE 1 is illustrated apparatus comprising generally a reel 10 having a hub 12 upon which is mounted a roll 14 of motion picture film 16, the film being in convolute relationship on said hub.

Affixed to the end of the film 16 is a transparent identification leader 18 which will be described in greater detail hereinafter.

As indicated above, there exists in accordance with the invention the possibilities of projecting information contained on the leader 18 by means of a conventional projector. This is diagrammatically illustrated in FIG. 1 by the presence of a screen 20 and a light beam indicated by arrow 22.

It will be noted with respect to FIG. 1 that the wound film on hub 12 is of a determinable diameter D in accordance with which the wound film will have an outer circumference of determinable length. This length may have a bearing on the arrangement of intelligence on the leader 18, as will hereinafter be seen in greater detail.

The film arrangement according to FIG. 2 comprises a film end 16' in which may be located a plurality of sequential frames 24 capable of producing a motion picture when employed in a conventional projector.

The film may be provided with a series of sprocket holes 26 along the periphery of the film and said sprocket holes can, if desirable, be laterally disposed along both edges of the film, as indicated by the presence of a second series of sprocket holes 28.

Also visible in FIG. 2 is the identification leader 18 wherein are positioned letters and numerals 30 representing generally indications of intelligence which are intended for visual perception and which are related to the subject matter on the motion picture film 16 and are intended to constitute an identification thereof. This intelligence may further comprise credits and other such information as may be desirably incorporated into the identification leader.

Indications 30 of the leader 18 may be distributed along a length L1 of the leader 18 which has a determinable relationship to the circumference relating to diameter D of FIG. 1. More particularly, length L1 should generally be no greater than the aforesaid circumference so that when the motion picture film and the identification leader are wound on the reel 10 with the identification leader outermost relative to the motion picture film, there will be no overlapping of the indications 30 so that all of the indication will be readily perceivable.

The identification leader 18 will generally be constituted by a transparent strip of film corresponding in width and thickness to the motion picture film 16. The leader 18 may be integral with the film 16 or may be spliced thereto, as indicated by film ends 32 and 34, the area 36 representing a bonding area at which the film sections are connection to one another in conventional manner.

In further accordance with the invention there is provided an opaque section or backing 38 having a length L2 and spaced from that section of the leader 18 containing the indications 30 by a distance L3.

The length L2 of the opaque section 38 is equal to or greater than the length L1. This assures that with a proper alignment of the opaque section 38 with that section of leader 18 bearing indications 30 a complete backing is provided for said indications.

An appropriate alignment of opaque section 38 with the section in which indications 30 are located is provided by a judicious selection of length L3 in association with the aforesaid predetermined circumference whereupon when the motion picture film 16 is wound on reel 10 with identification leader 18 outermost there will occur a proper alignment of the opaque section 38 with indications 30 and the opaque section 38 will underlie and provide a backing for said indications.

It will be appreciated from what has been stated above that the indications 30 may be of opaque characteristic and positioned on a transparent strip or that alternatively there is a possibility of making indications 30 of a transparent nature while the strip constituting leader 18 may be of opaque nature. In either event section 38 will be opaque and of a color intended to contrast to the color of the opaque section of leader 18.

FIGURE 3 illustrates a cross-section along line III—III of FIG. 2 and shows one preferred embodiment of the invention wherein film 16 provided with sprocket holes 26 and 28 is provided further with an opaque strip 40 constituting the opaque section 38 of FIG. 2. Opaque strip 40 may be any opaque strip of material having an adhesive, preferably pressure responsive surface adapted for adhering to film 16. It will be noted that a positioning of opaque body 40 at a zone remote from leader 18 leaves the leader 18 in its original unchanged condition, thereby facilitating a threading of the film aggregate into a projector.

FIGURE 4 illustrates a further embodiment of the invention and illustrates that the essential principle of the invention resides in spacing the opaque zone from that zone of the film containing the indications of intelligence. Thus, while various of the dimensions indicated above are preferred in accordance with the invention, some of the relationships can be omitted while still practicing the most essential features of the invention.

More particularly, FIG. 4 illustrates a film 46 including a generally transparent leader section 48 as an integral part thereof and having an opaque section 50 spaced from intelligence indications 52 and being located in part on that section of the film normally constituting the identification leader and in remainder on the motion picture film itself.

FIG. 4 also illustrates the use of a single alignment of sprocket holes 54 and further serves to illustrate that the opaque section may be an integral part of the film rather than a separate body as illustrated in FIG. 3.

In FIG. 4 the length of the opaque section 50 exceeds the length of that section of film part 48 containing indications 52 and the spacing of section 50 from indications 52 has not been made critical as in FIG. 2.

The article of manufacture of FIG. 4 will therefore not provide the perfect alignment as the above-described embodiment. However, the indications 52 will be provided with an opaque backing upon a winding of the film on a reel while at the same time an optical projection of indications 52 on a screen still remains as a possibility.

From the above description of some preferred embodiments of the invention it will now be evident that the opaque means of the invention may be applied to either side of the associated film without covering the related indications of intelligence, this resulting from the fact that the opaque means is not provided in the immediate vicinity of the indications of intelligence until the film is in wound condition on a reel. Thus, in specific accordance with the invention, an opaque body may be provided on either the emulsion side of a film or upon the side opposite thereto.

It will now be understood that a method of the invention relates to facilitating the identification of a film having, as an extension thereof, a generally transparent strip or film provided with visually perceptible indications of intelligence thereon, the method further comprising forming on the film an opaque length spaced longitudinally away from the aforesaid indications, the opaque length being adapted for underlying the indications to facilitate visual perception of the same.

An article of manufacture according to the invention may comprise a reel with a length of motion picture film adapted for being wound on the reel, and when positioned on the reel, adapted to constitute a wound film having an outer circumference of predetermined length, the invention further providing for a generally transparent strip of film corresponding in width and perhaps thickness to the motion picture film and provided with opaque indications of intelligence related to the motion picture film.

In further accordance with the invention the indications are restricted to a length of said transparent strip which is no longer than about the aforesaid predetermined length, the transparent strip of film being connected to said motion picture film to form an extension of the latter and the motion picture film and the strip forming a complete film which is in convolute relationship on the reel with the strip outermost.

The restricted length of strip on which the indications are located avoids an overlapping of the indications. The complete film includes an opaque length or body with a color contrasting to that of the indications and spaced from the length of transparent strip in which the indications are located and the opaque length is of such a dimension that it is adapted for underlying all of the aforesaid indications, the spacing of the opaque length from the indications permitting optical projection of the same.

There will now be obvious to those skilled in the art many modifications and variations of the structures and methods set forth above. These modifications and variations will not depart from the scope of the invention if defined by the following claims.

What is claimed is:

1. An article of manufacture comprising a reel, a length of motion picture film adapted for being wound on said reel, and when positioned on said reel, adapted to constitute a wound film having an outer circumference of predetermined length, and a generally transparent strip of film corresponding in width and thickness to the motion picture film provided with opaque indications of intelligence related to the motion picture film, the indications being restricted to a length of said transparent strip which is no longer than about said predetermined length, said transparent strip of film being connected to said motion picture film to form an extension of the latter, the motion picture film and strip forming a complete film, said complete film being in convolute relation on said reel with the strip outermost, the restricted length of strip in which said indications are located avoiding an overlapping of said indications, said complete film including an opaque length with a color contrasting to that of said indications and spaced from the length of transparent strip in which said indications are located, the opaque length being of a dimension such that it is adapted for underlying all of the said indications, the spacing of the opaque length from the indications permitting optical projection of the latter.

2. An article of manufacture comprising a length of motion picture film adapted for being wound on a reel and, when positioned on said reel, adapted to constitute a wound film having an outer circumference of predetermined length, and a generally transparent strip of film provided with indications of intelligence related to the motion picture film, the indications being restricted to a length of said transparent strip which is no longer than about said predetermined length, said transparent strip of film being connected to said motion picture film to form an extension of the latter, the motion picture film and strip forming a complete film, said complete film being in convolute relation on said reel with the strip outermost, the restricted length of strip in which said indications are located avoiding an overlapping of said indications, said complete film including a length of a color contrasting to that of said indications and spaced longitudinally from said indications, said length of color being adapted for underlying said indications to facilitate visual perception of the latter.

References Cited by the Examiner

UNITED STATES PATENTS

| | | | |
|---|---|---|---|
| 2,898,805 | 8/59 | Solow et al. | 352—235 |
| 3,022,165 | 2/62 | Solow et al. | 352—236 |

JULIA E. COINER, *Primary Examiner.*